US012518731B2

(12) United States Patent
Yamkovoy

(10) Patent No.: US 12,518,731 B2
(45) Date of Patent: Jan. 6, 2026

(54) POWER-ADAPTIVE ACTIVE NOISE REDUCTION (ANR) HEADSET

(71) Applicant: Bose Corporation, Framingham, MA (US)

(72) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 227 days.

(21) Appl. No.: 18/122,855

(22) Filed: Mar. 17, 2023

(65) Prior Publication Data

US 2024/0312448 A1 Sep. 19, 2024

(51) Int. Cl.
*H04R 1/10* (2006.01)
*G10K 11/178* (2006.01)

(52) U.S. Cl.
CPC .. *G10K 11/17825* (2018.01); *G10K 11/17823* (2018.01); *G10K 11/17881* (2018.01); *H04R 1/1083* (2013.01); *G10K 2210/1081* (2013.01); *G10K 2210/3016* (2013.01); *G10K 2210/3026* (2013.01); *G10K 2210/3027* (2013.01); *G10K 2210/3051* (2013.01); *G10K 2210/3056* (2013.01); *H04R 2460/01* (2013.01)

(58) Field of Classification Search
CPC ....... G10K 11/17825; G10K 11/17823; G10K 11/17881; G10K 2210/1081; G10K 2210/3016; G10K 2210/3026; G10K 2210/3027; G10K 2210/3051; G10K 2210/3056; G10K 11/17833; H04R 1/1083; H04R 2460/01; H04R 2460/03; H04R 1/1091; H04R 1/1041; H03G 7/007; H03G 7/002
USPC .......................................................... 381/71.6
See application file for complete search history.

(56) References Cited

U.S. PATENT DOCUMENTS

| | | | | |
|---|---|---|---|---|
| 4,060,701 A * | 11/1977 | Epley | H04R 29/00 73/584 |
| 9,049,513 B2 | 6/2015 | Yamkovoy | |
| 9,208,772 B2 | 12/2015 | Yamkovoy | |
| 9,208,773 B2 | 12/2015 | Yamkovoy | |
| 2009/0209945 A1* | 8/2009 | Lobl | A61M 5/14276 709/201 |
| 2012/0239325 A1* | 9/2012 | Sunyi | G01R 31/3835 702/63 |

(Continued)

FOREIGN PATENT DOCUMENTS

WO WO-2010129241 A1 * 11/2010 ............ A61F 11/145

OTHER PUBLICATIONS

International Search Report and Written Opinion for Application No. PCT/US2024/013664, dated Jun. 3, 2024, 11 pages.

*Primary Examiner* — Carolyn R Edwards
*Assistant Examiner* — Friedrich Fahnert
(74) *Attorney, Agent, or Firm* — Hoffman Warnick LLC

(57) ABSTRACT

Various aspects include active noise reduction (ANR) headsets and methods of controlling such headsets. In some implementations, a headset includes: at least one electro-acoustic transducer; a power source for powering the at least one electro-acoustic transducer; and a control circuit configured to apply active noise reduction (ANR) to environmental sound using the at least one electro-acoustic transducer, sample voltage drops across the power source, and adjust a compressor threshold for the ANR based on the sampled voltage drops across the power source.

25 Claims, 6 Drawing Sheets

(56) References Cited

U.S. PATENT DOCUMENTS

| | | | | |
|---|---|---|---|---|
| 2013/0148818 | A1 | 6/2013 | Yamkovoy | |
| 2013/0163775 | A1* | 6/2013 | Yamkovoy | G10K 11/17873 381/71.6 |
| 2014/0079236 | A1 | 3/2014 | Yamkovoy | |
| 2017/0019025 | A1* | 1/2017 | Yamkovoy | H02M 3/156 |
| 2017/0271891 | A1* | 9/2017 | Keates | H02J 7/0016 |
| 2019/0058952 | A1* | 2/2019 | Nawfal | H04R 5/027 |
| 2019/0379977 | A1* | 12/2019 | Büttner | G06N 3/088 |
| 2021/0211802 | A1* | 7/2021 | Arnott | H03G 9/005 |
| 2021/0349611 | A1* | 11/2021 | Chen | G06F 3/0485 |
| 2021/0350816 | A1 | 11/2021 | Rule et al. | |
| 2022/0283239 | A1* | 9/2022 | Kondo | H02J 7/0048 |

* cited by examiner

POWER-ADAPTIVE ACTIVE NOISE REDUCTION (ANR) HEADSET

TECHNICAL FIELD

This disclosure generally relates to wearable audio devices, such as headsets. More particularly, the disclosure relates to power-adaptive active noise reduction (ANR) headsets and related methods of controlling such headsets.

BACKGROUND

Relative to headsets (e.g., audio headsets) that provide only passive noise reduction (or, occlusion), headsets deploying active noise reduction (ANR) systems can significantly enhance user comfort and improve communications. However, ANR systems and associated acoustic components can consume a significant proportion of the power used to operate such headsets.

SUMMARY

All examples and features mentioned below can be combined in any technically possible way.

Various implementations of the disclosure include active noise reduction (ANR) headsets and methods of controlling such headsets.

In some particular aspects, a headset includes: at least one electro-acoustic transducer configured to provide an audio output; a power source for powering the at least one electro-acoustic transducer; and a control circuit configured to apply active noise reduction (ANR) to environmental (e.g., ear-cup residual) sound using the at least one electro-acoustic transducer, sample voltage drops across the power source, and adjust a compressor threshold for the ANR based on the sampled voltage drops across the power source.

In additional particular aspects, a method of controlling an active noise reduction (ANR) headset includes: applying ANR to environmental (e.g., ear-cup residual) sound using the headset, sampling voltage drops across a power source for the headset, and adjusting a compressor threshold for the ANR based on the sampled voltage drops across the power source.

Implementations may include one of the following features, or any combination thereof.

In certain aspects, the power source includes one or more batteries.

In particular cases, the one or more batteries are selected from a group of distinct batteries having distinct chemistries. In some examples, the batteries have distinct chemistries such as alkaline chemistries, lithium chemistries and/or nickel cadmium (NiCad) chemistries.

In some implementations, a voltage drop across a first one of the batteries is distinct from a voltage drop across a second one of the batteries. In some examples, the distinction in voltage drop between two distinct batteries is due at least in part to the difference in battery chemistry between the two distinct batteries.

In certain cases, the power source includes an external power source.

In particular implementations, the external power source includes a hard-wired connection with aircraft power.

In some cases, adjusting the compressor threshold enhances ANR performance of the headset.

In certain implementations, the enhanced ANR performance is characterized by at least one of a greater reduction in noise in the audio output or an increase in a gain in the audio output.

In particular aspects, adjusting the compressor threshold increases a battery life for the headset. In some examples, adjusting the compressor threshold aids in extending battery life where mechanical disturbances are encountered. In particular examples, mechanical disturbances can include head movement by the user (e.g., pilot), and/or significant change(s) in ambient noise (e.g., in an aircraft).

In some cases, adjusting the compressor threshold is performed automatically in response to a sampled voltage drop deviating from a voltage drop threshold.

In certain aspects, the compressor threshold is adjusted without a user input command.

In particular implementations, the control circuit is configured to sample the voltage drops on a recurring basis and dynamically adjust the compressor threshold in response to the sampled voltage drop deviating from the voltage drop threshold.

In some aspects, the recurring basis includes at least one of continuous sampling or periodic sampling. In some examples, continuous sampling is performed at defined intervals and/or dynamic intervals.

In certain implementations, adjusting the compressor threshold includes reducing the compressor threshold to reduce power consumption by the headset. In certain examples, reducing the compressor threshold reduces power consumption by one or more components in the headset, including the transducer, compressor circuit, and/or the ANR circuit.

In particular cases, sampling the voltage drops includes determining at least one of the following characteristics of the power source: source impedance, state of charge or discharge, battery quality, battery chemistry, connection quality, or voltage level over time.

In certain aspects, the headset further includes an interface enabling a user to input at least one characteristic of the power source, where the control circuit is configured to adjust the compressor threshold based on the at least one characteristic of the power source. In some examples, the interface enables the user to enter at least one of a battery type, battery serial number, battery brand, or battery size. In further examples, the interface enables the user to scan a quick response (QR) code associated with the battery and/or provide a photograph of the battery.

In some implementations, the headset further includes a feedforward microphone input and a feedback microphone input, where the control circuit includes an ANR engine and a compressor, and the compressor is configured to compress a feedback loop gain from the feedback microphone input according to the compressor threshold, prior to input at the ANR engine.

In particular aspects, the compressor threshold is determined with a compressor threshold control loop that has voltage drops across the power source as an input and a compressor threshold adjustment as an output.

In certain cases, the control circuit is further configured to adjust a power source monitoring system based on the sampled voltage drops. In some examples, the power source monitoring system updates a battery level, remaining battery life indicator, or remaining battery time indicator based on the sampled voltage drops.

In some aspects, sampling the voltage drops across the power source includes sending a set of test signals to the power source and measuring a voltage response for each of the set of test signals.

In certain implementations, an aviation audio device includes the headset.

In particular aspects, adjusting the compressor threshold aids in compliance with an aviation-specific communication protocol. In some examples, adjusting the compressor threshold aids in compliance with protocols relating to communication drops or disconnects, Bluetooth (BT) resets, garbled communication, and/or total harmonic disturbance (THD) standards. In particular cases, adjusting the compressor threshold aids in compliance with an aviation-specific communication protocol (e.g., Federal Aviation Administration protocol) requiring ten percent or less of THD.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
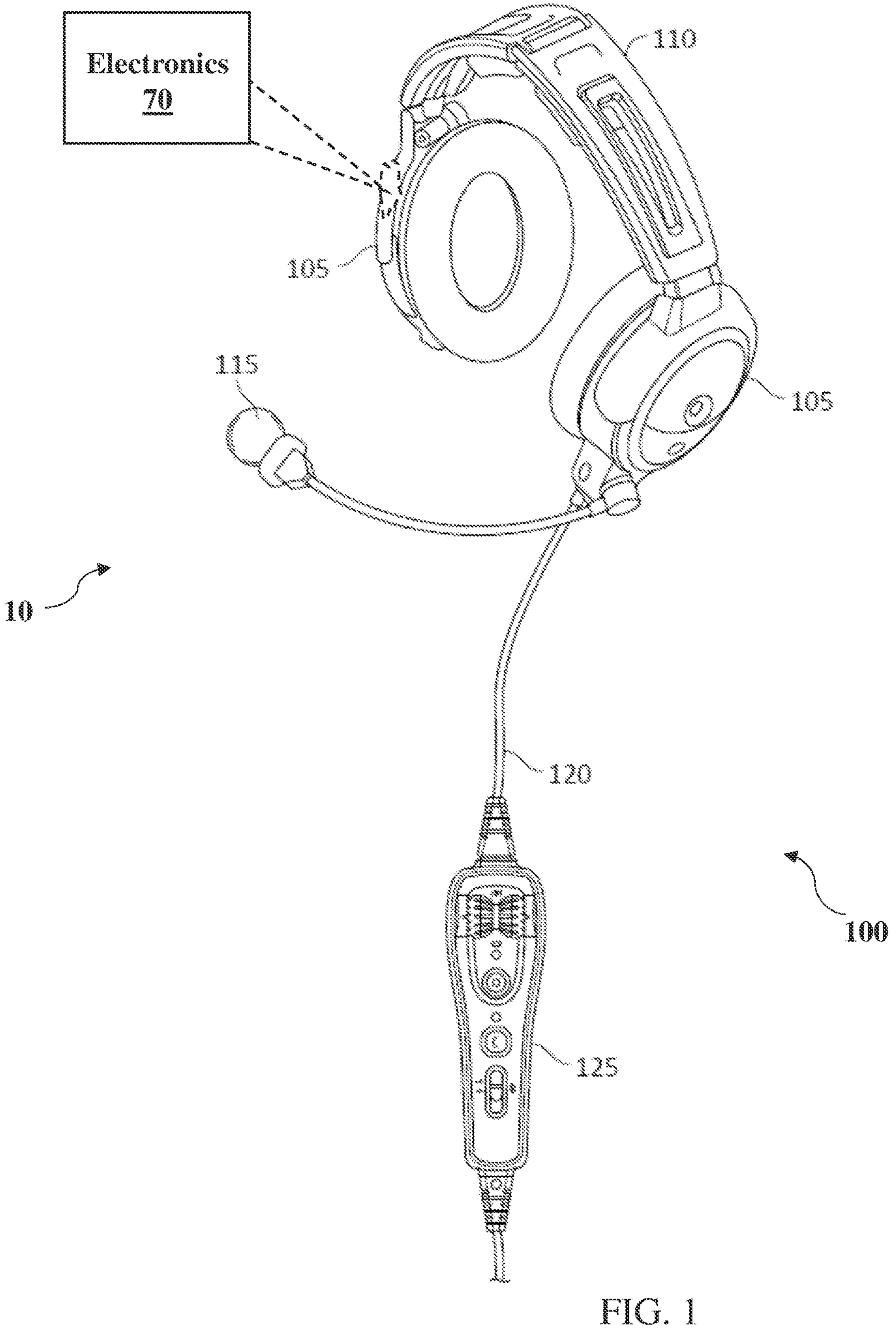
FIG. 1 is a schematic depiction of an audio device according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to active noise reduction (ANR) headsets with power-adaptive capabilities. In particular cases, the headset (e.g., audio headset) is configured to adjust an ANR configuration based on a detected characteristic of the headset power source. In more particular cases, the audio headset is configured to adjust a compressor threshold for ANR based on a sampled voltage drop across the headset power source.

Commonly labeled components in the FIGURES are considered to be substantially equivalent components for the purposes of illustration, and redundant discussion of those components is omitted for clarity.

As noted herein, ANR systems and associated acoustic components can consume a significant proportion of headset power resources. In certain conventional cases, low charge status, battery chemistry, and/or low quality power sources can develop increased internal source impedance, causing increased voltage drops across the power source as induced by load currents. This can diminish ANR performance in headsets relying on such power sources. In additional conventional cases, ANR systems are designed for worst-case power source scenarios, e.g., high power source impedance and/or low charge status. These conventional ANR systems are not adaptable to distinct power source characteristics, and as such, can under-utilize performance capabilities of the headset (e.g., when higher-quality power sources are available).

In contrast to these conventional systems, various implementations include a headset with a control circuit configured to apply ANR to environmental sound (or, ear cup residual sound), sample voltage drops across a power source (for the headset), and adjust a compressor threshold for the ANR based on the sampled voltage drops across the power source. In particular cases, the power source includes one or more batteries, and the headset is configured to detect distinct voltage drops across distinct batteries and adjust the compressor threshold(s) for ANR based on those distinct voltage drops.

Aspects and implementations disclosed herein may be applicable to a wide variety of wearable audio devices. In some cases, wearable audio devices can take various form factors, such as headphones (whether on or off ear), headsets, watches, eyeglasses, audio accessories or clothing (e.g., audio hats, audio visors, audio jewelry), a helmet (e.g., for military, industrial, or motorcycle applications), neck-worn speakers, shoulder-worn speakers, body-worn speakers, etc. Some aspects disclosed may be particularly applicable to personal (wearable) audio devices such as over-ear headphones, on-ear headphones, in-ear headphones (also referred to as earbuds), audio eyeglasses or other head-mounted audio devices. The wearable audio device is primarily described herein in the context of a headset (e.g., over-ear or in-ear), but the present disclosure is not intended to be so limited unless explicitly stated otherwise.

The wearable audio devices described according to various implementations can include features found in one or more other wearable electronic devices, such as smart glasses, smart watches, etc. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

The wearable audio devices described herein can be used for various different applications, such as for aviation, aerospace, military (e.g., for use in vehicles and/or for dismounted applications), broadcasting, coaching (e.g., for sports/athletics, such as football games), gaming, industrial (e.g., manufacturing, warehouse), construction, conferencing, vehicle-based transportation services (e.g., truck or van deliveries), auto racing, motorcycle or motorbikes, professional audio (e.g., studio production, audio mixing, live performances), and general lifestyle applications (e.g., consumer electronic wearable audio device, such as headphones or earbuds), as well as other applications that can be understood based on this disclosure. Moreover, a single wearable audio device (e.g., a single headset) can be used for multiple different applications, as the control platform of the audio device enables customizing the audio device to optimize suitability for the different applications. In some implementations, the customization of the audio device control platform occurs automatically based on one or more accessories that are connected to the audio device. Other triggers can be alternatively or additionally used to customize the audio device, such as based on user input using a connected control module (e.g., using an in-line control module and/or a mobile device application), environmental conditions (e.g., ambient noise level), sensor input (e.g., atmospheric pressure), or other triggers as will be apparent in light of this disclosure.

Some example implementations relate to audio devices that include aviation headsets. Aviation headsets are used by pilots in both general aviation and commercial aviation. Such headsets can be connected to aircraft communication systems, for example to communicate with air-traffic control (ATC) or with other pilots. The headsets can also be used as a public addressing system, for example, for the pilots to speak with passengers on board the aircraft. The aircraft communication systems typically include an analog communication system such as an intercom. In some cases, such an intercom system can be configured to communicate over the very-high-frequency (VHF) bands (e.g., 18 MHz to 136.975 MHz) wherein each channel is separated from the adjacent ones by a band of pre-specified width (e.g., 8.33 kHz in Europe, 25 kHz elsewhere). An analog modulation technique such as amplitude modulation (AM) can be used for the communications, and the conversations may be performed in simplex mode. In some cases, for example, for trans-oceanic flights, other frequency bands such as high-frequency (HF) bands can be used for satellite communications. Aviation headsets may be used, for example, by pilots and air-traffic controllers to communicate with one another. Even within the context of aviation use cases, the headset could be optimized based on the class or specific aircraft being used. For instance, classes could include, e.g., propeller aircraft, jet airliner, or helicopter, while specific aircrafts could include, e.g., the Boeing 737, Boeing 777, Airbus A320, or McDonnell Douglas DC-9.

An example of a wearable audio device 10 that includes an aviation headset 100 is shown in FIG. 1. In particular cases, the headset 100 includes a frame that has at least one earpiece (e.g., ear-cup) 105 on each side, which fits on, around, or over the ear of a user. In some cases, the frame is optional, such that the earpiece 105 is either tethered or wirelessly connected to other components in the wearable audio device 10. Each of the ear-cups 105 houses acoustic transducers or speakers. The headset 100 also includes a headband (e.g., an over-the-head bridge) 110 for connecting the two earpieces (e.g., ear-cups) 105. In various implementations, the headset 100 is configured to position at least one, and in some cases both, earpieces 105 proximate ears of the user. For example, the headset 100 (and other headset forms of audio device 10 described herein) can be configured, when worn by a user, to position the earpiece(s) 105 proximate to a user's ear. In certain cases, this proximity includes positioning the earpiece(s) 105 on or over the ears (e.g., using earcups), in the ears (e.g., using earbuds), resting on the ears (e.g., using ear hooks), etc. In some cases, proximate positioning results in full, partial, or no occlusion of the user's ear.

In some implementations, an electronic component (e.g., a microphone such as a boom microphone) 115 may be physically connected to one of the ear-cups 105. The headset 100 can be connected to the aircraft intercom system using the connecting cable 120, which may also include a control module 125 that includes one or more controls for the headset 100. In certain cases, the analog signals to and from the aircraft intercom system are transmitted through the wired connection provided by the connecting cable 120. In other cases, or in additional cases, the headset 100 can include electronics 70, such as control chips and/or circuitry, electro-acoustic transducer(s), microphones and associated modules, power components such as batteries and/or connectors, interface components such as capacitive touch interface components, etc. In particular cases, the electronics 70 include a controller coupled with an electro-acoustic transducer, where the controller is also configured to connect with an electronic component (e.g., when in a locked position with the audio device 10). In various implementations, the controller includes one or more processors, and is configured to communicate with an on-board memory and/or one or more remote storage devices.

It is further understood that electronics 70 can include other components not specifically depicted in the accompanying FIGURES, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. Electronics 70 can also include motion and/or position tracking components, such as optical tracking systems, inertial measurement units (IMUs) such as a microelectromechanical system (MEMS) device that combines a multi-axis accelerometer, gyroscope, and/or magnetometer, etc.

While the example in FIG. 1 illustrates an aviation headset that includes around-ear ear-cups, aviation headsets having other form-factors, including those having in-ear headphones or on-ear headphones, are also compatible with the technology described herein. In an example involving in-ear headphones, the over-the-head bridge may be omitted, and the boom microphone may be attached to the user via the headset or via a separate structure. Also, the term headset, as used in this document, includes various types of acoustic devices that may be used for aviation purposes, including, for example, earphones and earbuds. Additional headset features are disclosed, for example, in U.S. patent application Ser. No. 15/238,259 ("Communications Using Aviation Headsets," filed Aug. 16, 2016) and U.S. patent application Ser. No. 16/953,272 ("Wearable Audio Device with Control Platform," filed Nov. 19, 2020), each which is incorporated herein by reference in its entirety.

It is further understood that any component described as connected or coupled to another component in the audio device 10 or other systems disclosed according to implementations may communicate using any conventional hardwired connection and/or additional communications protocols. In some cases, communications protocol(s) can include a Wi-Fi protocol using a wireless local area network (LAN), a communication protocol such as IEEE 802.11 b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio device 10 are configured to communicate using one or more conventional wireless transceivers.

Figure 2:
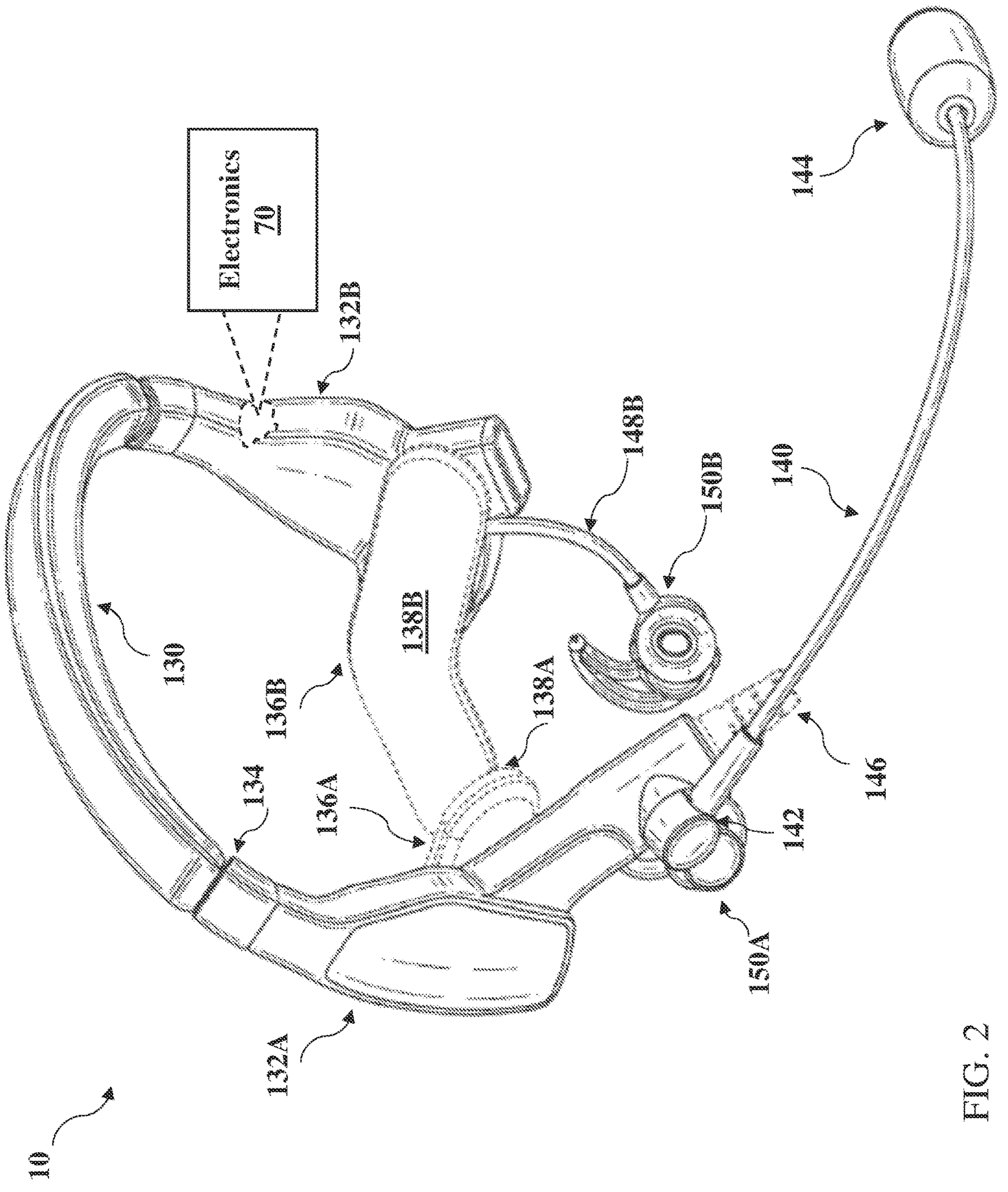
FIG. 2 is a schematic depiction of another audio device according to various implementations.

It is understood that the wearable audio devices 10 according to various implementations can take additional form factors. For example, FIG. 2 shows a wearable audio device 10 in the form of a personal communications headset 10 (e.g. an aviation headset). Reference numbers followed by an "A" or a "B" indicate a feature that corresponds to the right side or the left side, respectively, of the audio device 10. The audio device 10 includes a headband having an arcuate section 130, a right end and a left end. A right housing 132A and a left housing 132B are located at the right end and the left end, respectively, of the headband. The arcuate section 130 serves as an over-the-head bridge between the right and left housings 132. A spring band 134 (e.g., spring steel) extends from the right housing 132A, through the arcuate section 130 and to the left housing 132B. The spring band 134 provides a clamping force to move the housings 132 toward each other (approximately along a horizontal plane through the wearer's head) while the headband is worn by a user. The right and left housings 132 can be moved a distance either up and toward or down and away from the arcuate section 130 to accommodate a smaller or larger head, respectively.

A pad (right pad 136A or left pad 136B, generally 136) is attached to each housing 132 and is used to comfortably secure the headset 10 to the head. As used herein, a "pad" means a compliant member that can compress and/or deform under an applied pressure and that is configured for contact with the head of a user in a manner that supports the headband. In some cases, when the audio device (headset) 10 is worn on the head, each pad 136 extends from its forward end above the ear to its back end, which is lower on the head and behind the ear. In certain cases, the pads 136 each have a contoured surface 138 for contacting the head of the user. A boom 140 extends from a rotatable base 142 near the bottom of one of the housings (e.g., as illustrated, the right housing 132A) and is used to position and support a microphone 144 attached at the other end. The boom 140 may be adjusted, in part, by rotation about its base 142 to place the microphone 144 in proper position with respect to the mouth of the user. The boom 140 may be permanently affixed to the housing 132A or may be removable so that the audio device 10 can be used for both aviation and non-aviation uses (e.g., music playback). A connector 146 for a communications cable extends from the bottom of the right housing 132A. An earpiece (e.g., earbud) connector cable 148 extends at one end from each housing 132 and connects with an earpiece 150 such as an earbud or other type of in-ear headphone. Additional features of the audio device 10 in FIG. 2 are described in U.S. Pat. No. 10,187,718, which is entirely incorporated by reference herein.

Figure 3:
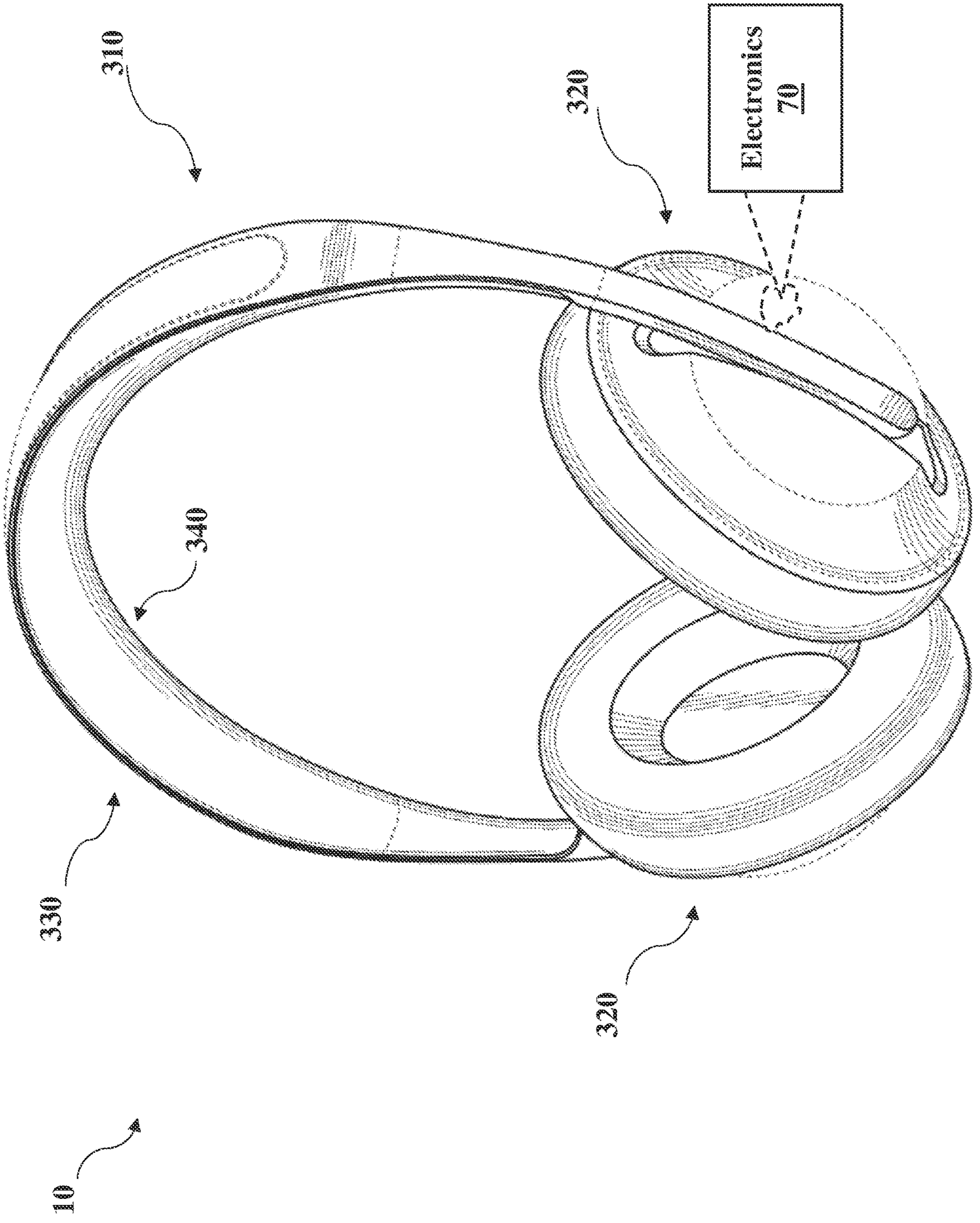
FIG. 3 is a schematic depiction of another audio device according to various implementations.

FIG. 3 depicts another audio device 10, including around-ear headphones 310. Headphones 310 can include a pair of earpieces (e.g., ear-cups) 320 configured to fit over the ear, or on the ear, of a user. A headband 330 spans between the pair of earpieces 320 and is configured to rest on the head of the user (e.g., spanning over the crown of the head or around the head). The headband 330 can include a head cushion 340 in some implementations. Stored within one or both of the earpieces 320 are electronics 70 and other components for controlling the headphones 310 according to particular implementations. Electronics 70 can include portions of, or connectors for, one or more electronic components as described with respect to the audio devices 10 herein. It is understood that a number of wearable audio devices described herein can utilize features of the various implementations, and the wearable audio devices 10 shown and described with reference to FIGS. 1-3 are merely illustrative. In addition to electronics 70, various implementations of audio device (or, headset) 10 can include one or more accessory ports for accommodating (e.g., interfacing or connecting with) an accessory, for example, a boom microphone, a battery module, a power connector, a sensor module, a communications module (e.g., a wireless module, such as to enable Bluetooth or Wi-Fi, and/or a wired module), a self-powered communications module (e.g., self-powered Bluetooth module), and/or a microphone module. In particular cases, accessories can be coupled with one or more portions of a headset 10, e.g., via an earpiece or earcup. Other connection configurations are also possible within the various implementations. Additional details of example accessory connections for an earpiece 400 are included in U.S. patent application Ser. No. 16/930,579 (Wearable Audio Device with Modular Component Attachment, filed on Jul. 16, 2020), which is incorporated by reference in its entirety.

Figure 4:
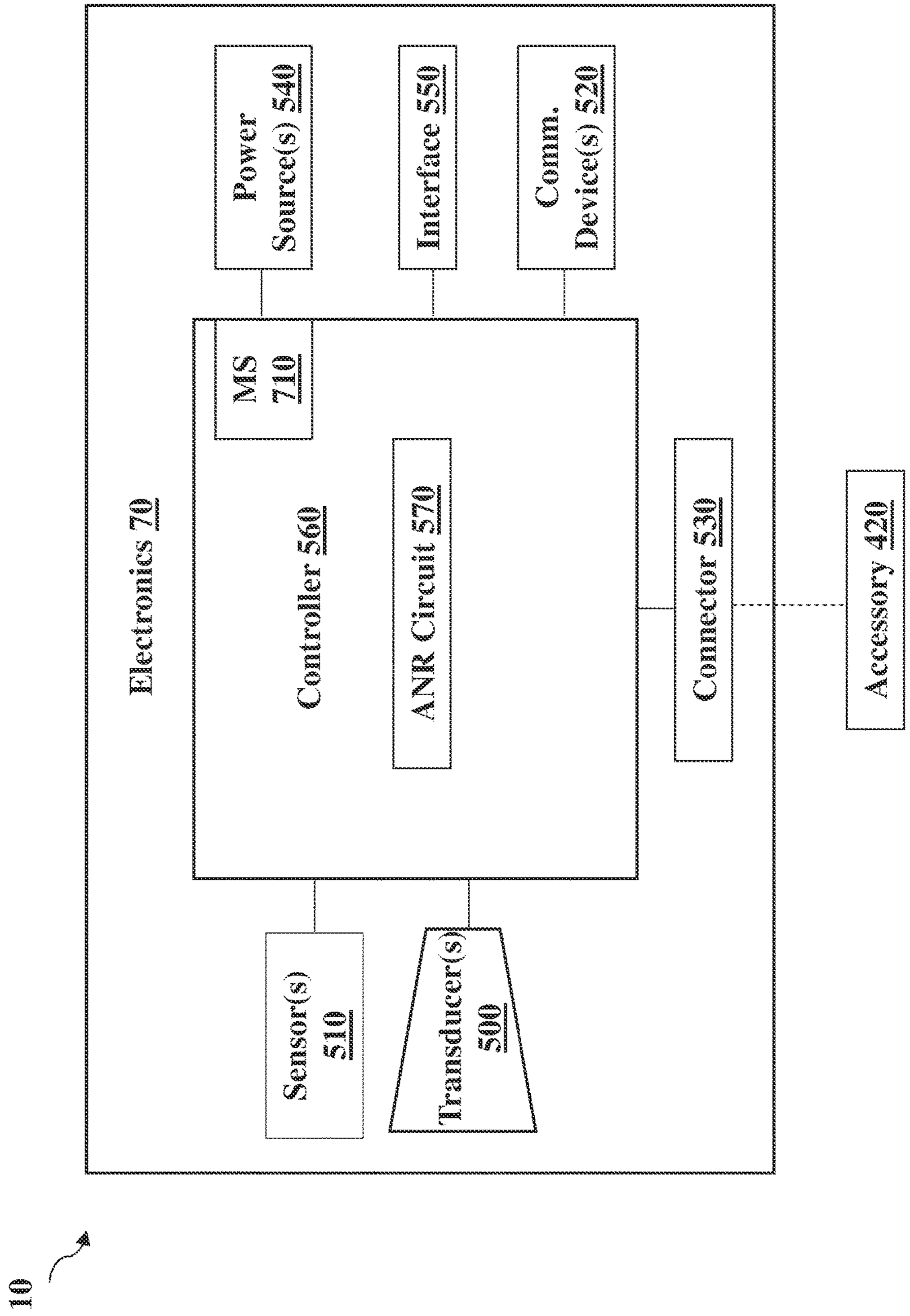
FIG. 4 is a schematic depiction of electronics included in an audio device according to various implementations.

FIG. 4 is a schematic depiction of example electronics 70 in a headset 10 according to various implementations. As described herein, in certain implementations, one or more components in electronics 70 can be located in a separate device (e.g., a smart device such as a smart phone, tablet computer, control module, electronic flight bag, etc.). Additionally, one or more functions performed by components in electronics 70 can be performed at a separate device from the wearable audio device 10, or duplicated at the separate device. In various particular implementations, each earpiece in a headset includes separate electronics 70.

In any case, returning to FIG. 4, the electronics 70 can include at least one transducer 500 for providing an audio output. Electronics 70 can also include one or more sensors 510, such as location-based sensors (e.g., geo-location sensors), motion-based sensors (e.g., inertial measurement unit(s), or IMUs), optical sensors, one or more microphones (e.g., a microphone array), etc. Electronics 70 can also include one or more communication devices 520, such as one or more transmitters and/or receivers (e.g., wireless and/or hard-wired transmitters/receivers). In various implementations, the communication devices 520 are configured for a plurality of communication protocols, e.g., Bluetooth, BLE, Zigbee, etc., as well as radio communication and intercom communications. Electronics 70 can also include an accessory port connector 530 for detecting a connection (e.g., electrical and/or communication connection) with an accessory (e.g., accessory 420). At least one power source 540 is shown (e.g., one or more batteries, charging devices and/or hard-wired power sources), along with an interface 550 (e.g., a user interface such as a touch screen, capacitive touch interface, gesture-detection interface, voice command interface, etc.).

The transducer(s) 500, sensors 510, communication device(s) 520, connector 530, power source(s) 540 and/or interface 550 can be connected with a control circuit (or, controller) 560, which in some cases, includes one or more processors (PU) for performing functions described herein. The processor(s) are coupled with memory in various implementations. In some cases, functions of distinct processors are performed in distinct controllers 560, which are not depicted. However, in other cases, the controller 560 can include one or more processors for performing functions, e.g., as dictated by execution of instructions stored in memory. In particular implementations, the controller 560 can include an active noise reduction (ANR) circuit 570 for controlling ANR functions in the headset 10. As described herein, the ANR circuit 570 can be configured to adjust audio output at the transducer(s) 500 based on detected voltage drops across the power source(s) 540.

Figure 5:
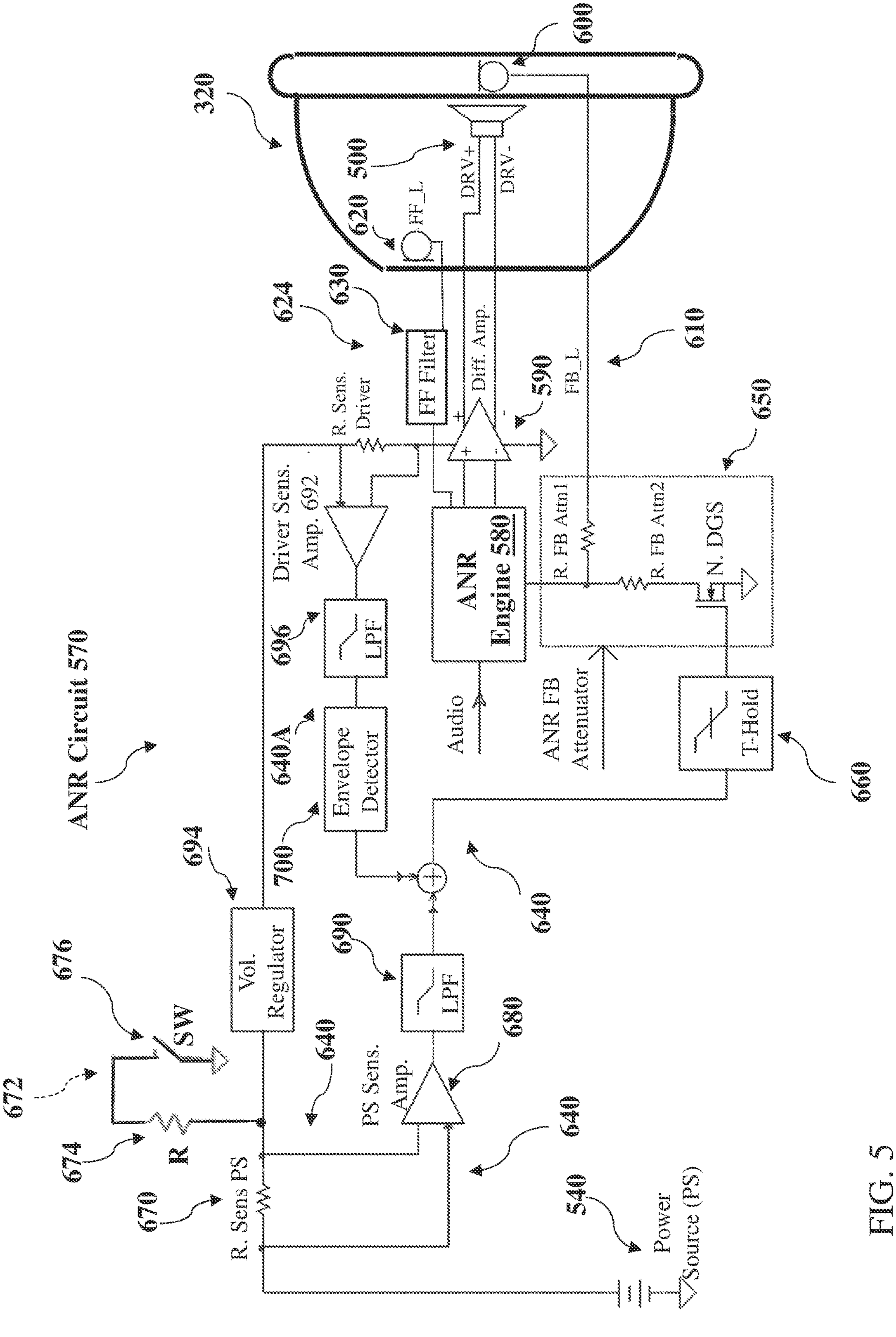
FIG. 5 is a schematic depiction of an active noise reduction (ANR) circuit in an audio device according to various implementations.

FIG. 5 shows a schematic depiction of an ANR circuit 570 according to various implementations. The ANR circuit 570 includes an ANR engine (or, ANR subsystem) 580 that is configured to control audio output to transducer 500 (e.g., adjust a gain on an amplifier 590, such as a differential amplifier) based on an input from a feedback microphone 600, illustrated as a feedback loop 610, and an input from a feedforward microphone 620 (after passing through feedback filter 624), illustrated as feedforward loop 630. A compressor threshold loop 640 is shown, illustrating an ANR compressor (also called an ANR feedback attenuator)

650 that is configured to compress the feedback input to the ANR engine 580 according to a compressor threshold 660.

Compression of the feedback loop 610 input is performed prior to the feedback loop input 610 entering the ANR engine 580 (or, outside of the ANR engine 580) because an uncompressed (e.g., noise-overloaded) feedback signal can overload the electronics in the ANR engine 580. For example, an uncompressed feedback signal can have a wide dynamic range (e.g., resulting from noise and/or buffeting) with a higher value than a maximum input value for the electronics of the circuitry in the ANR engine 580.

In various implementations, the ANR compressor 650 is configured to compensate for noise overloads to the ANR circuit 570, e.g., by sudden changes in ambient noise conditions and/or ambient noise exceeding a threshold. In operation, the ANR compressor 650 is configured to reduce the gain from the ANR feedback loop 610 in response to detecting a noise overload event, detecting a likely noise overload event, and/or in response to predicting a noise overload event.

As is illustrated in FIG. 5, the ANR circuit 570 includes compressor threshold loop 640 that enables adjustment of a compressor threshold 660 based on sampled voltage drops across the power source 540. The compressor threshold 660 can control an amount of attenuation of the input signal from feedback loop 610 prior to input at the ANR engine 580. The compressor threshold loop 640 is configured to sample voltage drops across the power source 540 (e.g., periodically, scheduled and/or on a recurring basis) and adjust the compressor threshold 660 based on those sampled voltage drops (e.g., in response to changes in voltage drops and/or deviation of voltage drop(s) from a threshold). As illustrated in the process flow diagram in FIG. 6, in various implementations, the ANR circuit 570 is configured to perform processes including: (P1) apply active noise reduction (ANR) to environmental sound (or, earcup residual sound) to provide an audio output at the at transducer(s) 500, and (P2) sample voltage drops across the power source 540. In decision (D3), the ANR circuit 570 compares the sampled voltage drop(s) with a voltage drop threshold (or, thresholds), and if the voltage drop(s) deviate from the threshold(s) (Yes to D3), in process (P4) the ANR circuit 570 adjusts the compressor threshold 660 for the ANR (e.g., ANR engine 580). If No to D3 (voltage drop(s) do not deviate from threshold(s)), the ANR circuit 570 continues sampling voltage drops across power source 540 on a periodic and/or continuous basis (revert to process (P2)).

With continuing reference to the example ANR circuit 570 in FIG. 5, the compressor threshold loop 640 includes a voltage detector 670 (e.g., a resistor) configured to detect a voltage drop across the power source 540. In particular cases, in addition to, or alternatively to using voltage detector 670, sampling the voltage drops across the power source 540 includes determining at least one of the following characteristics of the power source 540: source impedance, state of charge or discharge, battery quality, battery chemistry, connection quality, or voltage level over time.

In various implementations, voltage drop can be measured by determining the voltage difference between power source 540 (e.g., battery) positive and negative terminals under different loads. The correlation between measured power source current and voltage enables determining power source 540 (e.g., battery) impedance and its state of charge. This charge determination can also be achieved by momentarily loading the power source 540 with a predetermined load (resistor) and measuring voltage across terminals of the power source 540. Power source (e.g., battery) voltage drop, known resistor value and measured power source current can enable determining source impedance and state of charge for the power source 540. Further, an increasing source resistance of the power source 540 (e.g., battery) can be indicative of a change in the charge state of that power source 540.

As used herein, power source quality (within the same chemistry such as battery chemistry) can vary by power source manufacturer and typically correlates with cost. Proprietary chemistry and fabrication enhancements from some manufacturers (in addition to basic chemistry) can allow for greater battery capacity and for lower source impedance when compared with other manufacturers. Higher power source quality can allow for greater ability to deliver current and longer battery life.

In some aspects, sampling the voltage drops across the power source 540 includes sending a set of test signals to the power source 540 and measuring a voltage response for each of the set of test signals. In particular cases, as illustrated in FIG. 5 (as optional), a sampling circuit 672 can be used to sample voltage drops across the power source 540. The sampling circuit 672 can include a fixed resistor 674 and a control switch 676 for sampling voltage drops across the power source. In particular cases, the fixed resistor 674 and control switch 676 can be used to produce a pre-determined load current from the power source 540. Analyzing the voltage at power source 540 and voltage drop across the resistor 674 enables determination of power source impedance. In certain cases, the control switch 676 can be controlled via hardware and/or software functions, e.g., by the controller 560, which can include one or more microcontrollers.

As shown in the example circuit in FIG. 5, a voltage drop amplifier (or, power source sensing amplifier) 680 amplifies the voltage drop signal detected by voltage detector 670, and that amplified signal passes through a low pass filter (LPF) 690. The output of the LPF 690 is added to an output from a distinct portion 640A of the compressor threshold loop 640. That portion 640A of the compressor threshold loop 640 includes an amplifier 692 for amplifying a driver resistance signal comparing the output from a voltage regulator 694 and the output of the differential amplifier 590, a low pass filter 696 for filtering the amplified signal, and an envelope detector 700 for outputting a demodulated envelope of the signal from the low pass filter 696. The output of the envelope detector 700 and the low pass filter 690 from the other portion 640 of the compressor threshold loop 640 are used to define the compressor threshold 660. In certain cases, the output of the envelope detector 700 and the low pas filter 690 are summed to define an adjustment to the compressor threshold 660.

As noted herein, variations in characteristics of power sources can impact headset performance, and in certain cases, result in diminished performance, over-usage of power resources, and/or under-usage of performance capabilities. The ANR circuit 570 shown and described herein is configured to improve headset performance, enhance battery life, etc., by dynamically adjusting the compressor threshold 660 based on characteristics of the power source 540. In certain implementations, the power source 540 includes one or more batteries. For example, the power source 540 can include one or more replaceable, rechargeable, and/or disposable batteries. In particular cases, the one or more batteries are selected from a group of distinct batteries having distinct chemistries. In some examples, the batteries have distinct chemistries such as alkaline chemistries, lithium chemistries and/or nickel cadmium (NiCad) chemistries. In some implementations, a voltage drop across a first one of the batteries is distinct from a voltage drop across a second one of the batteries. In some examples, the distinction in voltage drop between two distinct batteries is due at least in part to the difference in battery chemistry between the two distinct batteries.

In additional implementations, the power source 540 includes an external power source. An example external power source can include a hard-wired connection such as a hard-wired connection with aircraft power or military vehicle power. In some cases, distinctions in external power source type and/or connection quality can be detectable by the ANR circuit 570, e.g., with distinct associated voltage drops across those power source(s) 540.

As noted herein, particular implementations, adjusting the compressor threshold 660 enhances ANR performance of the headset 10. For example, the enhanced ANR performance can be characterized by a greater reduction in noise in the audio output to transducer(s) 500 and/or an increase in a gain in the audio output to transducer(s) 500. In further implementations, adjusting the compressor threshold 660 increases the battery life (e.g., of battery-type power source 540) for the headset 10. In some examples, adjusting the compressor threshold 660 aids in extending battery life where mechanical disturbances are encountered. In particular examples, mechanical disturbances can include head movement by the user (e.g., pilot), and/or significant change(s) in ambient noise (e.g., in an aircraft). For example, when the headset 10 is used as an aviation and/or military headset, the user (e.g., pilot) may change head direction (or, look direction) frequently and/or suddenly, which can impact the occlusive seal of the headphones on the user's ear or ear region. Further, significant changes in ambient noise are common in aviation and/or military applications. In conventional headsets, changes in occlusion and/or significant swings in ambient noise can cause overload events (e.g., clicking, garbled speech in communications, etc.) and tax the power source. In contrast to conventional headsets, the headset 10 is configured to effectively respond to changes in occlusion as well as significant changes in ambient noise, e.g., by conserving power resources when not beneficial, and/or enhancing noise cancelation performance when beneficial.

Figure 6:
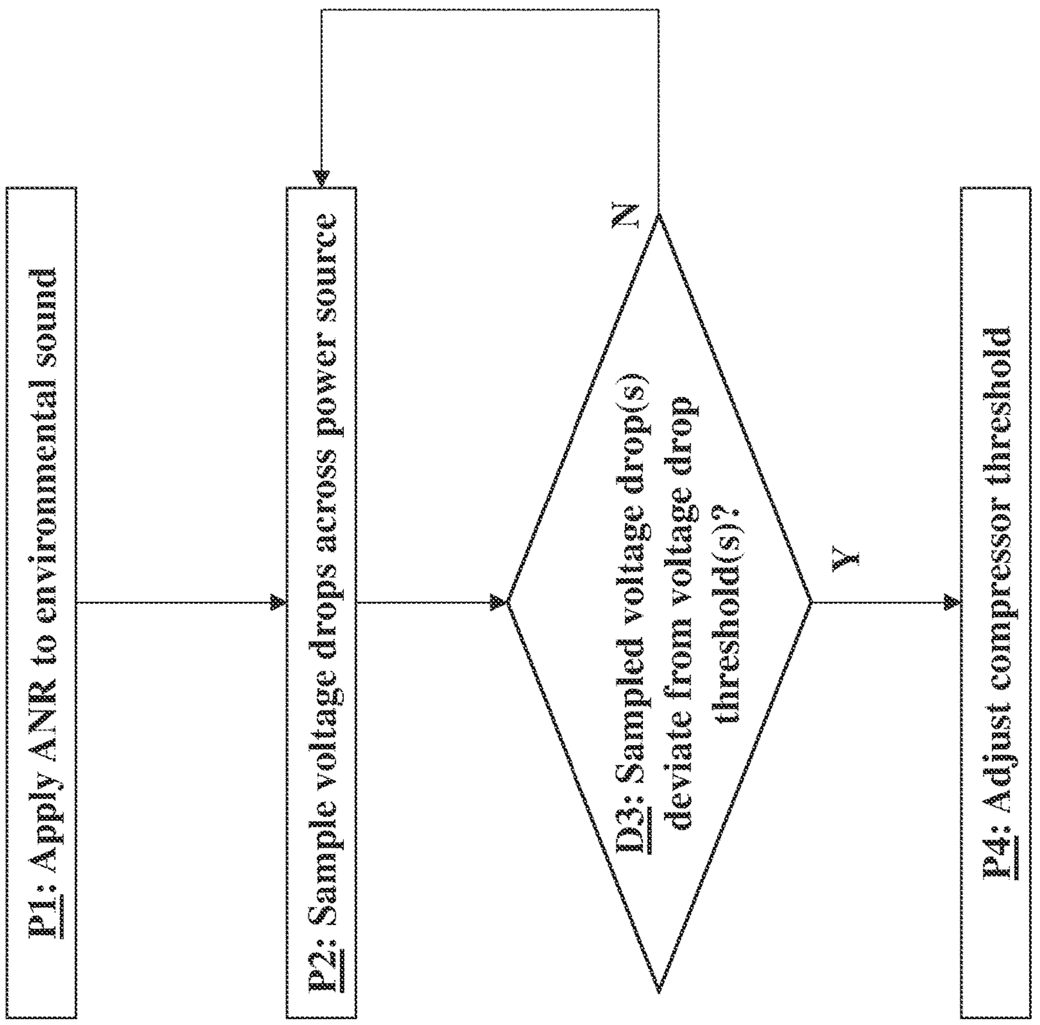
FIG. 6 is a flow diagram illustrating processes in adjusting ANR in an audio device according to various implementations.

In some cases, as noted with respect to the flow diagram in FIG. 6, adjusting the compressor threshold 660 is performed automatically in response to a sampled voltage drop deviating from a voltage drop threshold. For example, a voltage drop threshold can be equal to approximately three percent, five percent, 10 percent, 15 percent, 20 percent, or a value such as X volts. In various implementations, the ANR circuit 570 samples the voltage drop across power source 540, and if that voltage drop deviates from the threshold (e.g., greater than Z percent, or less than Y volts), automatically adjusts the compressor threshold 660. That is, the ANR circuit 570 is configured to adjust the compressor threshold 660 without a user input command. In various implementations, automatic adjustment of the compressor threshold 660 is based on one or more sampled voltage drops deviating from a voltage drop threshold (or thresholds). In certain implementations, the voltage drop threshold includes a range of values or percentages. In further cases, the threshold is adjusted over time, e.g., based on a recent history of sampled voltage values.

In particular cases, the ANR circuit 570 is configured to sample the voltage drops on a recurring basis and dynamically adjust the compressor threshold 660 in response to the sampled voltage drop deviating from the voltage drop threshold. In some aspects, the recurring basis includes continuous sampling and/or periodic sampling. In some examples, continuous sampling is performed at defined intervals and/or dynamic intervals. In certain additional cases, the ANR circuit 570 samples the voltage drop(s) in response to a trigger. Various, non-limiting triggers can include detecting changes in an accessory connection to the audio device 10, detecting a change in power source 540 (e.g., change between batteries, or between battery and hard-wired source), detecting a change in a power state of the audio device 10 (e.g., power cycling, power on, sleep mode), detecting a change in ambient acoustic conditions (e.g., significant changes in ambient noise level), or a user interface command to initiate or change an operating mode of the audio device 10.

In certain implementations, adjusting the compressor threshold 660 includes reducing the compressor threshold 660 to reduce power consumption by the headset 10. In certain examples, reducing the compressor threshold 660 reduces power consumption by one or more components in the headset, including the transducer 500, compressor circuit 660, and/or the ANR circuit 570. Reducing the compressor threshold 660 can extend the life of the power source 540 in various implementations.

As noted herein, the sampled voltage drops across the power source 540 can be sampled by determining at least one of the following characteristics of the power source 540: source impedance, state of charge or discharge, battery quality, battery chemistry, connection quality, or voltage level over time. In certain aspects, the interface 550 enables a user to input at least one characteristic of the power source 540, where the control circuit 560 is configured to adjust the compressor threshold based on the characteristic(s) of the power source 540. In some examples, the interface 550 enables the user to enter at least one of a battery type, battery serial number, battery brand, or battery size. In further examples, the interface 550 enables the user to scan a quick response (QR) code associated with a battery and/or provide a photograph of a battery.

In additional implementations, the controller 560 (FIG. 4) includes a power source monitoring system (MS) 710 that is configured to monitor aspects of the power source 540, e.g., a quality of power source connection, a remaining power available from the power source 540 (e.g., where power source is a battery), etc. The power source monitoring system 710 can provide real-time or near real-time information about the power source, e.g., via one or more interface(s) 550 at the headset 10 (such as a visual display and/or audio output via transducer 500). In particular cases, the power source monitoring system 710 updates a battery level, remaining battery life indicator, or remaining battery time indicator based on the sampled voltage drops across the power source 540.

As noted herein, various aspects of the headset 10 can be beneficial in consumer applications, commercial airplane usage, private airplane usage, transportation, military usage, etc. In certain implementations, the headset 10 is part of an aviation audio device that is required to comply with an aviation-specific communication protocol. In some examples, adjusting the compressor threshold 660 aids in compliance with protocols relating to communication drops or disconnects, Bluetooth (BT) resets, garbled communication, and/or total harmonic disturbance (THD) standards. In particular cases, adjusting the compressor threshold 660 aids in compliance with an aviation-specific communication protocol (e.g., Federal Aviation Administration protocol) requiring ten percent or less of THD.

As noted herein, various particular implementations enable a headset to adaptively assign a compressor threshold for an ANR system based on characteristics of the headset power source. In particular cases, the headset 10 is configured to operate using a variety of power sources or types of power sources, such as different battery types, e.g., including alkaline, lithium, NiCad, etc., and tailor the compressor threshold accordingly. Certain conventional headsets fix the compressor threshold based on assumptions about or predetermined characteristics of the power source, for example, that the power source is an alkaline battery of a certain quality. While voltage discharge across alkaline batteries can be generally linear in nature, voltage discharge across distinct battery types (e.g., lithium) can follow a different profile. Further, the source impedance, battery quality (high v. low), state of charge, and connection quality can all impact the output of a power source (e.g., battery). As noted herein, conventional headsets fail to account for the above-noted variations in power source characteristics (e.g., battery characteristics), and tailor the compressor threshold accordingly. Various particular implementations can periodically, continuously, or responsively (e.g., in response to a trigger) sample voltage drops across a power source and adjust the compressor threshold accordingly. Further, various particular implementations can use information about the power source (e.g., battery make or model) to determine the compressor threshold.

Even further, various implementations of headset 10 can be configured to assign distinct compressor thresholds for distinct ANR profiles. For example, as described in U.S. patent application Ser. No. 16/953,272 (previously incorporated by reference), a headset can be configured to apply distinct ANR profiles based on one or more inputs, or triggers. ANR profiles may differ from one another based on a number of acoustic characteristics, including but not limited to, maximum level of noise cancelation, filter coefficients, equalization, spectrum, etc. Headset 10 can enable switching of ANR profiles, e.g., using interface 550. For example, the interface 550 can include a touch interface, button, switch, or other physical interface for selecting, or switching between ANR configurations. In certain implementations, the interface 550 can include a mechanical switch such as a two-position or three-position switch enabling a user to command the controller 560 to switch between profiles, ANR configurations and/or other settings. In some examples, the interface 550 includes a mechanical switch enabling a user to switch between at least two ANR configurations. For example, the mechanical switch enables switching between one use-specific ANR configuration (e.g., an aviation-specific ANR configuration) and another use-specific ANR configuration (e.g., a broadcast-specific ANR configuration or music playback-specific ANR configuration).

Additionally, various implementations of the headset 10 can be configured to sample voltage drops across the power source 540 in response to connection of an accessory at the headset 10 and/or disconnection of an accessory 420 at the headset 10 (FIG. 4). In some cases, the ANR circuit 570 is further configured to adjust the compressor threshold based on a type of accessory 420 connected at the headset 10, for example, where the controller 560 can assign a battery usage profile to the accessory 420. In such cases, the controller 560 can be configured to adjust the compressor threshold 660 based on both the sampled voltage drop across the power source 540 and the type of accessory 420 connected to the headset 10. Non-limiting examples of accessories can include: a cable (e.g., connector cable) configured to attach the headset 10 to at least one other device (e.g., electronic flight bag, external sensor module, etc.), a microphone or an array of microphones, one or more image capture devices, such as a camera, one or more light capture devices, such as one or more photodectors, lidar sensors, or opto-electronic devices (e.g., for scanning or transmitting/receiving), a positioning system, such as a global positioning system (GPS), local positioning system, or indoor positioning system, etc. Additional triggers which can be used to initiate sampling of voltage drops across the power source 540, e.g., to adjust compressor threshold 660 are described in U.S. patent application Ser. No. 16/953,272 (previously incorporated by reference).

Various implementations include headsets configured to perform active noise reduction (ANR) according to approaches described herein. Further aspects of ANR that may be compatible with implementations herein are described in in U.S. patent application Ser. No. 16/788,365 (Computational Architecture for Active Noise Reduction, filed on Feb. 12, 2020), which is incorporated by reference in its entirety.

As noted herein, in contrast to conventional audio devices, the headsets 10 according to various implementations provide a number of benefits. For example, the headsets 10 according to various implementations enable tailored performance and power management functions based on power source characteristics, and are configured to extend battery life and/or improve performance relative to conventional headsets. Additionally, in some cases, headsets 10 are configured for use in a plurality of scenarios and/or industries, e.g., from casual use by a consumer to professional use by a pilot, military personnel, a sporting coach, or an entertainment professional. The headsets 10 are configured to apply distinct ANR compression thresholds based on characteristics of the power source. The headsets 10 shown and described according to various implementations can enhance the user experience, as well as improve performance, relative to conventional audio devices.

Though the elements of several views of the drawings may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals may be encoded and transmitted in either digital or analog form; conventional digital-to-analog or analog-to-digital converters may be omitted from the figures. Some of the figures may include logic elements such as decision blocks, comparators, or logic gates. The output of logic elements will be designated as "0" (which corresponds to "NO" or "Low" or "open circuit") or "1" (which corresponds to "YES" or "High" or "closed circuit").

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, accessories (e.g., electronic components) described as being "coupled" can be linked via conventional hard-wired and/or wireless means such that these accessories can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

I claim:

1. A headset comprising:

at least one electro-acoustic transducer configured to provide an audio output;

a power source for powering the at least one electro-acoustic transducer; and a control circuit configured to apply active noise reduction (ANR) to environmental sound using the at least one electro-acoustic transducer, sample voltage drops across the power source, and adjust a compressor threshold for the ANR based on the sampled voltage drops across the power source, wherein the compressor threshold is adjusted using a compressor threshold loop that includes a voltage detector configured to detect a voltage drop across the power source.

2. The headset of claim 1, wherein the power source includes one or more batteries.

3. The headset of claim 2, wherein the one or more batteries are selected from a group of distinct batteries having distinct chemistries.

4. The headset of claim 3, wherein a voltage drop across a first one of the batteries is distinct from a voltage drop across a second one of the batteries.

5. The headset of claim 1, wherein the power source includes an external power source.

6. The headset of claim 5, wherein the external power source includes a hard-wired connection with aircraft power.

7. The headset of claim 1, wherein adjusting the compressor threshold enhances ANR performance of the headset, wherein the enhanced ANR performance is characterized by at least one of a greater reduction in noise in the audio output or an increase in a gain in the audio output.

8. The headset of claim 1, wherein adjusting the compressor threshold increases a battery life for the headset.

9. The headset of claim 1, wherein adjusting the compressor threshold is performed automatically in response to a sampled voltage drop deviating from a voltage drop threshold, wherein the compressor threshold is adjusted without a user input command.

10. The headset of claim 9, wherein the control circuit is configured to sample the voltage drops on a recurring basis and dynamically adjust the compressor threshold in response to the sampled voltage drop deviating from the voltage drop threshold, wherein the recurring basis includes at least one of continuous sampling or periodic sampling.

11. The headset of claim 1, wherein adjusting the compressor threshold includes reducing the compressor threshold to reduce power consumption by the headset.

12. The headset of claim 1, wherein sampling the voltage drops includes determining at least one of the following characteristics of the power source source impedance, state of charge or discharge, battery quality, battery chemistry, connection quality, or voltage level over time.

13. The headset of claim 1, further including an interface enabling a user to input at least one characteristic of the power source, wherein the control circuit is configured to adjust the compressor threshold based on the at least one characteristic of the power source.

14. The headset of claim 1, further including a feedforward microphone input and a feedback microphone input, wherein the control circuit includes an ANR engine and a compressor, wherein the compressor is configured to compress a feedback loop gain from the feedback microphone input according to the compressor threshold, prior to input at the ANR engine.

15. The headset of claim 1, wherein the control circuit is further configured to adjust a power source monitoring system based on the sampled voltage drops.

16. The headset of claim 1, wherein sampling the voltage drops across the power source includes sending a set of test signals to the power source and measuring a voltage response for each of the set of test signals.

17. The headset of claim 1, wherein the control circuit further includes a sampling circuit including a fixed resistor and a control switch to produce a pre-determined load current from the power source, wherein determining the voltage drop includes determining power source impedance based on comparing the voltage at the power source and the voltage drop across the resistor.

18. The headset of claim 1, wherein the voltage drops are sampled by determining the voltage difference between positive and negative terminals of the power source under different loads.

19. A method of controlling an active noise reduction (ANR) headset, the method comprising:

applying ANR to environmental sound using the headset, sampling voltage drops across a power source for the headset, and adjusting a compressor threshold for the ANR based on the sampled voltage drops across the power source, wherein the compressor threshold is adjusted using a compressor threshold loop in the ANR headset that includes a voltage detector configured to detect a voltage drop across the power source.

20. The method of claim 19, wherein the power source includes one or more batteries.

21. The method of claim 20, wherein the one or more batteries are selected from a group of distinct batteries having distinct chemistries, wherein a voltage drop across a first one of the batteries is distinct from a voltage drop across a second one of the batteries.

22. The method of claim 19, wherein the power source includes an external power source, wherein the external power source includes a hard-wired connection with aircraft power.

23. The method of claim 19, wherein sampling the voltage drops includes determining a source impedance of the power source, and wherein adjusting the compressor threshold enhances ANR performance of the headset in providing an audio output, wherein the enhanced ANR performance is characterized by at least one of a greater reduction in noise in the audio output or an increase in a gain in the audio output.

24. A headset comprising:

at least one electro-acoustic transducer configured to provide an audio output;

a power source for powering the at least one electro-acoustic transducer; and a control circuit configured to apply active noise reduction (ANR) to environmental sound using the at least one electro-acoustic transducer, sample voltage drops across the power source, and adjust a compressor threshold for the ANR based on the sampled voltage drops across the power source, wherein the control circuit further includes a sampling circuit including a fixed resistor and a control switch to produce a pre-determined load current from the power source, and wherein determining the voltage drop includes determining power source impedance based on comparing the voltage at the power source and the voltage drop across the resistor.

25. The headset of claim 24, wherein the power source includes one or more batteries.

* * * * *